United States Patent [19]

Polizzi et al.

[11] 4,109,957
[45] Aug. 29, 1978

[54] QUICKLY REMOVABLE WINDSHIELD CURTAIN

[76] Inventors: Joseph R. Polizzi, 5431 Pageantry, Long Beach, Calif. 90808; Richard K. Hart, 11422 Yearling Cr., Cerritos, Calif. 90701

[21] Appl. No.: 805,721

[22] Filed: Jun. 13, 1977

[51] Int. Cl.² ............................................. B62D 25/00
[52] U.S. Cl. ............................ 296/95 C; 160/DIG. 2
[58] Field of Search ................... 296/84 M, 90, 95 C, 296/93, 138, 142, 145, 95 R, 95 Q, 97 D; 160/DIG. 2, DIG. 3, DIG. 13, 368

[56] References Cited

U.S. PATENT DOCUMENTS

| 1,437,479 | 12/1922 | Stromberg | 296/142 |
| 3,042,111 | 7/1962 | Wytovich | 296/95 C |

*Primary Examiner*—Philip Goodman
*Attorney, Agent, or Firm*—Fulwider, Patton, Rieber, Lee & Utecht

[57] ABSTRACT

A quickly removable curtain assembly for covering the inside of a vehicle windshield. The curtain assembly includes an opaque cloth panel for covering the windshield and front side windows of a vehicle such as a recreation vehicle or van.

4 Claims, 8 Drawing Figures

QUICKLY REMOVABLE WINDSHIELD CURTAIN

BACKGROUND OF THE INVENTION

1. Field of the Invention

The present invention relates, generally, to automotive vehicles, and more particularly, to a quickly removable curtain assembly for covering the inside of a vehicle windshield and the front side windows thereof.

2. Description of the Prior Art

Where curtains are provided for the windshield and front side windows of a vehicle such as a recreational vehicle or a van, such curtains are supported by conventional curtain rods or tracks. Such rods or tracks are unsightly. Moreover, with the curtain or curtains moved to their opened position, the curtains are bulky, tend to distract the driver and often rattle. The curtain-supporting hardward is comparatively costly, particularly when it is considered that the curtains are only used periodically i.e., when the vehicle is utilized for overnight trips.

SUMMARY OF THE INVENTION

It is a major object of the present inveniton to provide a quickly removable curtain assembly for covering the inside of a vehicle windshield and the front side windows of such vehicle utilizing a plurality of snap fasteners, some of which are affixed to transparent vacuum cups engageable with the vehicle's windshield in such a manner that the vacuum cups may be permanently secured to the windshield without disturbing the vision of the driver.

Another object of the present invention is to provide a removable curtain assembly of the aforedescribed nature which may be economically manufactured and yet which is rugged and lightweight.

A further object of the present invention is to provide a removable curtain assembly of the aforedescribed nature which may afford a long and trouble-free service life.

Still another object of the present invention is to provide a removable curtain assembly of the aforedescribed nature wherein a single size of the curtain panel will accommodate several vehicle models.

These and other objects and advantages of the present invention will become apparent from the following detailed description.

DESCRIPTION OF THE PREFERRED EMBODIMENT

Figure 1:
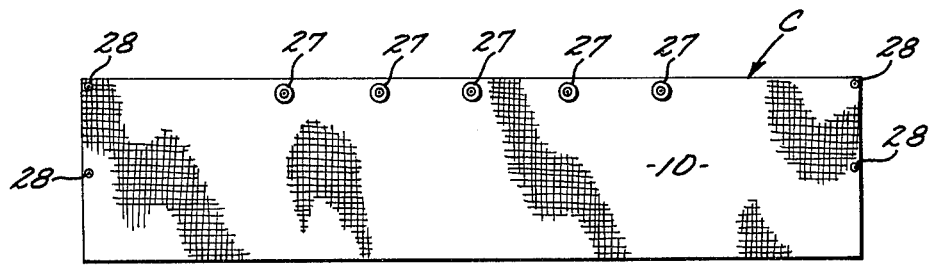
FIG. 1 is an elevational view of a removable curtain assembly embodying the present invention.
Figure 2:
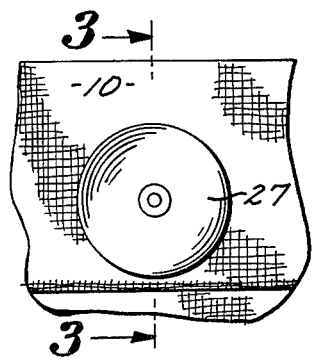
FIG. 2 is a fragmentary view, in enlarged scale, showing a suction cup and snap fastener arrangement forming a part of said curtain assembly as viewed from the rear.
Figure 3:
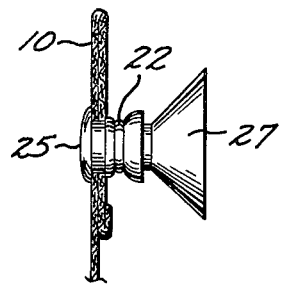
FIG. 3 is a side view of the suction cup arrangement of FIG. 2 taken in section along line 3—3 of FIG. 2.
Figure 6:
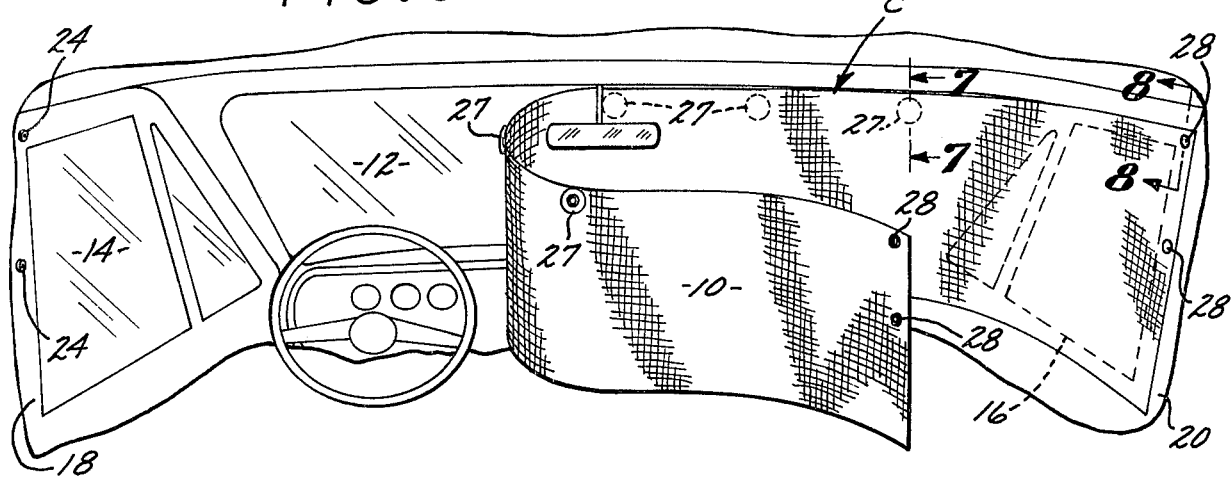
FIG. 6 is a perspective view showing said curtain assembly being arranged in an operative position.

Referring to the drawings, there is shown in FIG. 1 a front view of a removable curtain assembly C embodying the present invention. Such assembly includes an opaque, generally rectangular cloth panel 10 having outer dimensions sufficient to cover the interior of the windshield 12 and the front side windows 14 of a vehicle such as a recreational vehicle or a van. Referring to FIG. 6, the interior of such a vehicle is shown. It is to be understood that the curtain assembly C is adapted to be removably secured over the interior of the windshield 12 and the left and right front side windows 14 and 16 of the vehicle, so as to afford complete privacy for the occupants of the vehicle.

Figure 7:
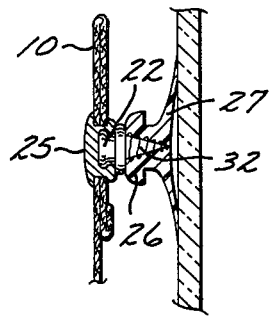
FIG. 7 is a vertical sectional view taken in enlarged scale along line 7—7 of FIG. 6.
Figure 4:
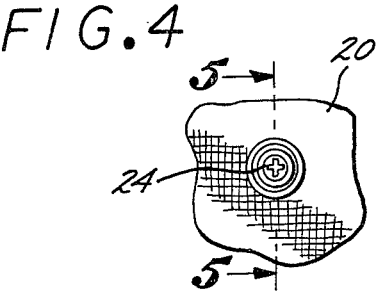
FIG. 4 is a rear view of a fixed snap fastener arrangement utilized to secure the curtain panel to the vehicle side panel.
Figure 5:
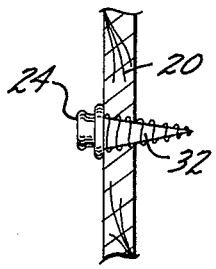
FIG. 5 is a side elevational view taken along line 5—5 of FIG. 4.
Figure 8:
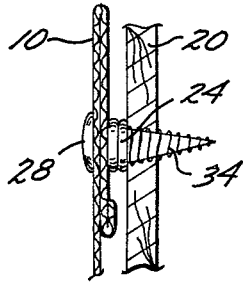
FIG. 8 is a vertical sectional view taken along line 8—8 of FIG. 6.

More particularly, the upper edge of the cloth panel 10 is provided with a plurality of horizontally spaced male snap fastener halves 22, while the side edges of such panel are provided with a plurality of vertically spaced female snap fastener halves 24. The male snap fastener halves 22 are adapted to be removably engageable with a plurality of mating female snap fastener halves 25, each secured to the hub 26 of a conventional suction cup 27 formed of a suitable synthetic plastic. The female snap fastener halves 24 are adapted to be removably engageable with a plurality of male snap fastener halves 28 that are fixedly secured to the vehicle front door jamb posts 18 and 20 rearwardly of side windows 14 and 16 (FIG. 6). As indicated in FIG. 7, each female snap fastener half is provided with a screw 32 that is threaded into the solid material of the suction cup hub 26. As indicated in FIG. 5, each male snap fastener half 28 is of similar construction, but with the screw 32 thereof being extended through the side panels 18 and 20.

In order to install the aforedescribed curtain assembly C within the cab of the vehicle, one of the vacuum cups 26 is positioned upon the upper center portion of windshield 12 as close as possible to the windshield's moulding. Thereafter, the center female snap fastener half 28 on panel 10 is snapped to its mating male snap fastener half carried by the just-affixed suction cup 26. The curtain 10 will now have its upper center portion attached to the upper center portion of the windshield 12. Next, the male snap fastener halves of the remaining suction cups 27 are affixed to their complementary female snap fastener halves along the upper portion of curtain 10. Thereafter, these remaining suction cups are pressed against the upper portion of windshield 12 as close as possible to the windshield's moulding. At this point, the entire windshield 12 will be covered by the curtain 10. In order to apply the rear portion of curtain 10 over the front side window 16 of the passenger side of the vehicle, such curtain is held up to the door jamb post 20 so as to determine the location for fixedly securing the male fastener halves 28 to such door jamb post. The screws 32 are then utilized to secure the male snap fastener halves 24 along the door jamb post as in the positions indicated in FIG. 6. The same procedure is repeated on the driver's side. The female snap fastener halves 28 along the rear left and right edges of the curtain 10 may then be engaged with their mating male snap fastener halves. At this point, the front side windows 14 and 16 will also be covered by the curtain 10.

It should be understood that the curtain 10 may be readily applied to and removed from its operative position. When the curtain 10 is removed, the suction cups 27 may remain in place along the upper portion of the windshield. Since these suction cups 27 are formed of transparent material, they will not interfere with the drivers's vision. If, however, it is desired to remove such suction cups, such removal may be readily effected by lifting a portion of the periphery thereof away from the windshield. If the material of the door jamb posts 18 and 20 are suitable for retaining suction cups, such suction cups may be utilized rather than the fixed snap fastener arrangement shown in the drawings. Generally, however, the door jamb post material is of such a nature that it will not satisfactorily operate with suction cups. It will be readily apparent that when the panel 10 is removed from its operative position it may be readily stowed within the vehicle for subsequent reuse.

It should be noted that the aforedescribed arrangement lends itself to a do-it-yourself kit.

Various modifications and changes may be made with respect to the foregoing detailed description without departing from the spirit of the present invention.

We claim:

1. A quickly removable curtain assembly for covering the inside of a vehicle windshield, and front side windows forwardly of the door jamb posts of said vehicle, said curtain assembly comprising:

an opaque generally rectangular cloth panel having outer dimensions sufficient to cover the interior of said windows and extend rearwardly over the front portion of said door jamb posts;

a plurality of first snap fastener halves secured along the top edges of said panel;

a plurality of second snap fastener halves secured along the rear edges of said panel;

a plurality of suction cups, each supporting a snap fastener half removably engageable with one of said first snap fastener halves, said suction cups being removably applicable to the upper interior surface of said windshield; and additional snap fastener halves secured to said door jamb posts and removably engageable with one of said second snap fastener halves positioned along the rear edges of said door jamb posts.

2. A quickly removable curtain assembly as set forth in claim 1, wherein:

said suction cups are formed of a transparent material.

3. A quickly removable curtain assembly as set forth in claim 1, wherein:

said additional snap fastener halves are fixedly secured to said door jamb posts.

4. A quickly removable curtain assembly as set forth in claim 2, wherein:

said additional snap fastener halves are fixedly secured to said door jamb posts.

* * * * *